United States Patent [19]

Nagai et al.

[11] Patent Number: 6,058,365
[45] Date of Patent: May 2, 2000

[54] SPEECH PROCESSING USING AN EXPANDED LEFT TO RIGHT PARSER

[75] Inventors: Akito Nagai; Kenji Kita; Shigeki Sagayama, all of Kyoto, Japan

[73] Assignee: ATR Interpreting Telephony Research Laboratories, Kyoto, Japan

[21] Appl. No.: 08/086,569

[22] Filed: Jul. 6, 1993

Related U.S. Application Data

[63] Continuation of application No. 07/761,156, Sep. 17, 1991, abandoned.

[30] Foreign Application Priority Data

Nov. 16, 1990 [JP] Japan .................................. 2-311974

[51] Int. Cl.⁷ ...................................................... G10L 5/06
[52] U.S. Cl. .......................................... 704/257; 704/256
[58] Field of Search ........................... 395/2; 381/41–50; 364/419

[56] References Cited

U.S. PATENT DOCUMENTS

| | | | |
|---|---|---|---|
| 4,931,928 | 6/1990 | Greenfeld | 364/300 |
| 4,984,178 | 1/1991 | Hemphill et al. | 364/513.3 |
| 5,033,087 | 7/1991 | Bahl et al. | 395/2 |
| 5,054,074 | 10/1991 | Bakis | 395/2 |
| 5,086,472 | 2/1992 | Yoshida | 395/2 |
| 5,105,353 | 4/1992 | Charles et al. | 395/700 |

OTHER PUBLICATIONS

L.R. Bahl et al., "Decision Trees For Phonological Rules in Continuous Speech", ICASSP '91 (Toronto, Canada) May 14–17, 1991, pp. 185–188.

*Primary Examiner*—David D. Knepper
*Attorney, Agent, or Firm*—McDermott, Will & Emery

[57] ABSTRACT

Continuous speech is recognized by selecting among hypotheses, consisting of candidates of symbol strings obtained by connecting phonemes corresponding to a Hidden Markov Model (HMM) having the highest probability, by referring to a phoneme context dependent type HMM from input speech using a HMM phoneme verification portion. A phoneme context dependent type LR (Left-Right) parser portion predicts a subsequent phoneme by referring to an action specifying item stored in an LR (Left to Right) parsing table to predict a phoneme context around the predicted phoneme using an action specifying item of the LR table.

5 Claims, 6 Drawing Sheets

```
(1)  START → NP   VP
(2)  START → VP
(3)  NP  → N
(4)  NP  → N    P
(5)  VP  → o    k    u    r    e
(6)  VP  → k    u    r    e
(7)  N   → k    a    n    e
(8)  P   → o
```

ACTION TABLE

| STATE | * | k | r | a | o | e | n | u | S |
|---|---|---|---|---|---|---|---|---|---|
| 0 |  | s2 |  |  | s5 |  |  |  |  |
| 1 | r3 |  |  |  | s7 |  |  |  |  |
| 2 |  |  |  | s10 |  |  |  |  | s9 |
| 3 | r2 |  |  |  |  |  |  |  |  |
| 4 |  | s11 |  |  | s5 |  |  |  |  |
| 5 |  | s13 |  |  |  |  |  |  |  |
| 6 |  |  |  |  |  |  |  |  | aoo |
| 7 | r8 |  |  |  |  |  |  |  |  |
| 8 | r4 |  |  |  |  |  |  |  |  |
| 9 |  |  | s14 |  |  |  |  |  |  |
| 10 |  |  |  |  |  | s15 |  |  |  |
| 11 |  |  |  |  |  |  |  |  | s9 |
| 12 | r1 |  |  |  |  |  |  |  |  |
| 13 |  |  |  |  |  |  |  |  | s16 |
| 14 |  |  |  |  | s17 |  |  |  |  |
| 15 |  |  |  |  | s18 |  |  |  |  |
| 16 |  |  | s19 |  |  |  |  |  |  |
| 17 | r6 |  |  |  |  |  |  |  |  |
| 18 | r7 |  |  |  |  |  |  |  |  |
| 19 |  |  |  |  | s20 |  |  |  |  |
| 20 | r5 |  |  |  |  |  |  |  |  |

GO TO TABLE

| STATE | START |  | NP | VP | N | P |
|---|---|---|---|---|---|---|
| 0 | 6 |  | 4 | 3 | 1 |  |
| 1 |  |  |  |  |  | 8 |
| 4 |  |  |  | 12 |  |  |

FIG. 5

SPEECH PROCESSING USING AN EXPANDED LEFT TO RIGHT PARSER

This application is a continuation of application Ser. No. 07/761,156 filed Sep. 17, 1991 now abandoned.

BACKGROUND OF THE INVENTION

1. Field of the Invention

The present invention relates to continuous speech recognition devices. More particularly, the present invention relates to a continuous speech recognition device that unifies speech recognition and language processing by using a LR table for predicting input speech data to verify the prediction with the phoneme verification function of a HMM phoneme recognition device.

2. Description of the Background Art

A HMM-LR method is known as a continuous speech recognition method for carrying out speech recognition and language processing efficiently in a single integrated process. This method carries out efficient processing of high reliability without the means of intermediate data such as phrase lattice by managing speech recognition and language processing in unification which was carried out separately before.

A probability of phoneme predicted by a language processing method called the HMM-LR method (LR parser) is calculated by a speech recognition method called the HMM (Hidden Markov Model) method in the HMM-LR method. The LR method and the HMM method will be explained prior to the explanation of the HMM-LR method.

In the field of computational geometry, particularly in the processing system of programming language, techniques of syntax analysis are studied profoundly. One such method is called the LR parser. This LR parser is a type of the so-called SHIFT-REDUCE type parser where analysis is carried out by reading the input symbol from left to right. The LR parser holds internally a "state" to determine the next action to be taken according to the current state and the input symbol. The following four actions are allowed in the LR parser:

(1) ACCEPT
(2) ERROR
(3) SHIFT
(4) REDUCE

ACCEPT indicates the reception of an input symbol string in the LR parser. ERROR indicates that the input symbol string is not received in the LR parser. SHIFT accumulates the current input symbol read by the LR parser and the current state on a stack. REDUCE reduces the topmost symbol in the stack to a greater unit using a grammar rule. In REDUCE, the state symbols and the input symbols are removed from the stack by the number of grammar rules in the right-hand side of the grammar rule used.

A list called the LR table is referred to for determining the action of the LR parser from the current state and the input symbol. A LR table must be prepared in advance for analysis with the LR parser. The LR table can be implemented mechanically from a grammar rule.

FIG. 4 shows an example of a grammar rule, and FIG. 5 shows an example where the grammar rule of FIG. 4 is converted into a LR table.

It can be appreciated from FIG. 5 that the LR table is formed of two tables called the ACTION table and the GOTO table. The states of the LR parser are indicated along the ordinate and input symbols are arranged along the abscissa in the ACTION table, with the action to be taken by the LR parser denoted in each segment of the table. Referring to FIG. 5, the action denoted "acc" indicates ACCEPT, and the empty space in the table indicates ERROR. The symbols with a prefix s indicates SHIFT. The number following s indicates the state to be taken by the LR table after the SHIFT action. The symbols with a prefix r indicates REDUCE. The number n following r indicates the execution of a reduce action using the n-th grammar rule.

The LR parser refers to the GOTO table after the REDUCE action. The states of the LR parser are indicated along the ordinate, with non-terminal symbols shown along the abscissa in the GOTO table. The LR parser determines a new state by the GOTO table from the non-terminal symbol obtained from the REDUCE action and the current state. The state of the LR parser at the initiation of the analysis is 0. The analysis terminates with the LR parser carrying out an ACCEPT action to receive an input symbol string, or carrying out ERROR action to not receive an input symbol string.

A recognition processing method called the HMM method regarding utterance as a probablistic state transition is known in the field of speech recognition.

FIG. 6 is a typical phoneme model diagram used in the HMM method. The method of phoneme recognition by HMM will be explained hereinafter with reference to FIG. 6. The probability of transition between states and the value of the output probability of a symbol are given in each ellipsis of the HMM, whereby a probablistic symbol string is provided according to these values. In speech recognition by the HMM method, a number of HMMs according to the number of the phoneme types are prepared in advance. A probability of the phoneme HMM is obtained which provides a symbol string of training phoneme data at the highest probability from training phoneme data, whereby the probability of the output of an unknown phoneme data symbol string from the whole HMM is calculated to establish the phoneme corresponding to the HMM having the highest probability as the recognition result.

The manipulation of calculating the probability of the unknown phoneme data is called phoneme verification. This operation is carried out for the HMM of FIG. 6 by the following procedures.

(Definitions of Symbols)

N: Length of symbol string of unknown phoneme data $O_i$: The i-th symbol in the unknown phoneme data symbol string M: The number of states of the verified phoneme HMM $a(i, j)$: Transition probability of the ellipsis connecting state i and state j in the verified phoneme HMM $b(i, j, k)$: The probability of the ellipsis connecting state i and state j in the verified phoneme HMM to provide symbol k (Initialization)

$P(0, 0) = 1.0$ $P(0, j) = 1.0e^{-\infty}$ $(j=1 \ldots M)$ $P(0, j) = 1.0e^{-\infty}$ $(j=1 \ldots N)$ (Recursion Calculation $(i=1 \ldots N, j=1 \ldots M)$)

$P(i, j) = P(i-1, j) \times a(j, j) \times b(j, j, O_i)$
$+ P(i-1, j-1) \times a(j-1, j) \times b(j-1, j, O_i)$ $Q(i) = P(i, M)$ $(i=1 \ldots N)$ The result of the phoneme verification is given in probability table $Q(1) \ldots Q(N)$.

Hence, the HMM-LR method is a method of unifying the LR method and the HMM method in performing analysis. The HMM-LR method calculates the probability of the predicted phoneme by predicting the phoneme in the uttered speech data to actuate HMM phoneme verification. This allows simultaneous performance of speech recognition and language processing. Efficient processing of high reliability can be carried out without the means of intermediate data which serve to unify speech recognition and language processing. The HMM-LR method will simply be called parser hereinafter.

The parser grows simultaneously various potential parsing trees. A parsing tree represents a sentence as a string of words, where the relationships thereof are illustrated in the form of a tree. A parsing tree is supplied with a value indicating the probability of that parsing tree to be received. The parsing tree is regarded not worthy of being grown and is rejected when the probability value becomes lower than a predetermined threshold value. The parser comprises a plurality of regions for storing information associated with the currently grown parsing tree. This region is called a cell hereinafter. One parsing tree corresponds to one cell. A cell corresponding to an already received parsing tree is called an active cell. The information stored in the cell includes the following:

(1) A state stack of the LR parser (2) The value of probability table $Q(1) \ldots Q(N)$ calculated in the prior phoneme verification.

N is the length of the symbol string corresponding to the input phoneme data.

At the initiation of the analysis, only one cell C exists, with state 0 provided at the topmost state stack of the LR parser of the only one cell C. The following values are provided as initial values in the probability table Q of this cell Q.

$Q(0)=1.0$ $Q(i)=1.0e^{-\infty}$ (i=1 ... N)

The parser then selects one active cell and reads state s from the topmost step of the LR state stack of that cell to look into the action table corresponding to state s in the LR table. When the selected action is SHIFT, an input symbol A to be SHIFTed is HMM phoneme-verified to update the values in the probability table of the cell as below.

(Recursion calculation)

$P(0, j)=1.0e^{-\infty}$ (j=1 ... M')

$P(i, 0)=Q(i)$ (i=1 ... N)

$P(i, j)=P(i-1, j) \times a(j, j) \times b(j, j, Oi)$
$+P(i-1, j-1) \times a(j-1, j) \times b(j-1, j, Oi)$
(i=1 ... N, j=1 ... M')

$Q(i)=P(i, M')$ (i=1 ... N)

where M' is the number of states of symbol A in the HMM.

If Q(i) having the highest probability value in the probability table $Q(1) \ldots Q(N)$ updated by the above calculation is smaller than the threshold value, this cell is discarded. Otherwise, a new state is accumulated upon the LR state stack.

When the selected action is REDUCE, a reduce action by the grammar rule will be executed. This action is identical to that of a normal LR parser. When the selected action is ACCEPT, the analysis will be completed after all the input phoneme data are processed.

There is a method of describing a phoneme model used in speech recognition in integration by environment information around the phoneme. This is called phoneme environment clustering (PEC). This method derives a cluster of environment dependent phonemes by minimizing the total distortion amount in the mapping of phoneme pattern space and phoneme environment space. Phoneme context, pitch, power, speaker, utterance speed, and language are some of the factors of the phoneme environment. The information of phoneme context is considered to be particularly critical for the phoneme environment. Particularly in the HMM-LR method where the phoneme context is already known, recognition of high precision can be expected using a phoneme model of high phoneme separation obtained by PEC.

If phoneme context is taken as the factor of phoneme environment, the phoneme model determined by phoneme environment clustering results in a model dependent upon phoneme context. Therefore, the parser must carry out actions dependent upon phoneme context in order to carry out continuous speech recognition using this phoneme model. However, the conventional LR parser of the HMM-LR method could not carry out actions according to the phoneme context, so that the above-described phoneme context dependent type phoneme model could not be used.

SUMMARY OF THE INVENTION

From the foregoing, a main object of the present invention is to provide a continuous speech recognition device for using a phoneme context dependent type phoneme model.

The method and apparatus for continuous speech recognition of the present invention use HMM data for a plurality of types of phonemes stored in advance. To verify a specific one of the phonemes, the probability that the specific phoneme exists in the input speech signal is determined. A currently verified phoneme is used for predicting a succeeding phoneme. Stored history information is referred to for predicting the phoneme context of the predicted succeeding. The predicted succeeding phoneme is then verified by calculating the probability that that phoneme exists in the input speech signal using a phoneme context dependent type HMM phoneme model which corresponds to the predicted phoneme context.

In accordance with the present invention, a phoneme context dependent type phoneme model can be implemented.

According to a preferable embodiment of the present invention, a plurality of types of phoneme HMMs are stored in advance, whereby a probability of a phoneme HMM is learned in advance to output a symbol string of training phoneme data at the highest probability. With respect to an input phoneme data, the probability of that phoneme data to be output from all the HMM is calculated, whereby a candidate of a symbol string hypothesis obtained by connecting phonemes corresponding to the HMM with the highest probability is provided as the recognition result.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows an example of a grammar rule converted into a LR table.

DESCRIPTION OF THE PREFERRED EMBODIMENTS

Figure 1:
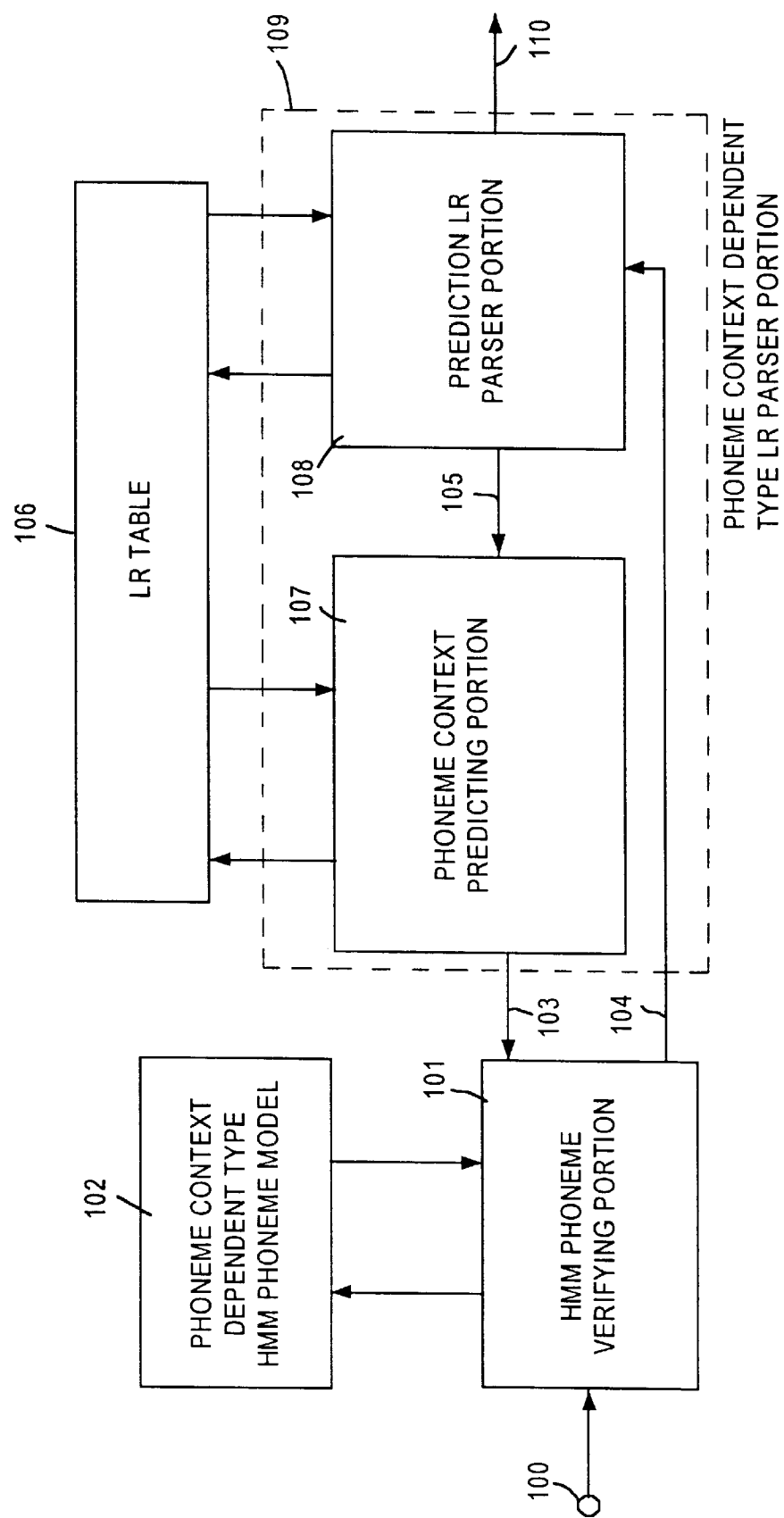
FIG. 1 is a schematic block diagram of an embodiment of the present invention.

FIG. 1 is a schematic block diagram showing a structure of an embodiment of the present invention. The structure of the embodiment of the present invention will be explained hereinafter with reference to FIG. 1. An input phoneme signal is applied to a HMM speech verification portion 101 via an input terminal 100. HMM phoneme verification portion 101 implemented with a computer verifies a phoneme using a phoneme context dependent type HMM phoneme model 102 stored in a memory. A phoneme context dependent type LR parser portion 109 implemented with a computer comprises a phoneme context prediction portion 107 and a prediction LR parser portion 108. Prediction LR parser portion 108 predicts a subsequent phoneme from a LR table 106. The predicted phoneme is applied to phoneme context prediction portion 107. With that predicted phoneme as the current phoneme, phoneme context prediction portion 107 refers to LR table 106 and the history information of the phoneme context described in the cell to predict the phoneme context in that predicted phoneme.

Following the determination of a phoneme environment cluster adaptable to the above-described predicted phoneme context, a control signal 103 is applied to HMM phoneme verification portion 101 to actuate it in order to evaluate whether the predicted phoneme actually exists in the speech signal. HMM phoneme verification portion 101 carries out phoneme verification with respect to the predicted phoneme using a phoneme context dependent type HMM phoneme model corresponding to that phoneme environment cluster. A verification result 104 for the predicted phoneme by HMM phoneme verification portion 101 is returned to prediction LR parser portion 108. Prediction LR parser portion 108 repeats a similar operation until an ACCEPT action is found in LR table 106. Then, a recognition result 110 is provided from prediction LR parser portion 108.

Figure 2A:
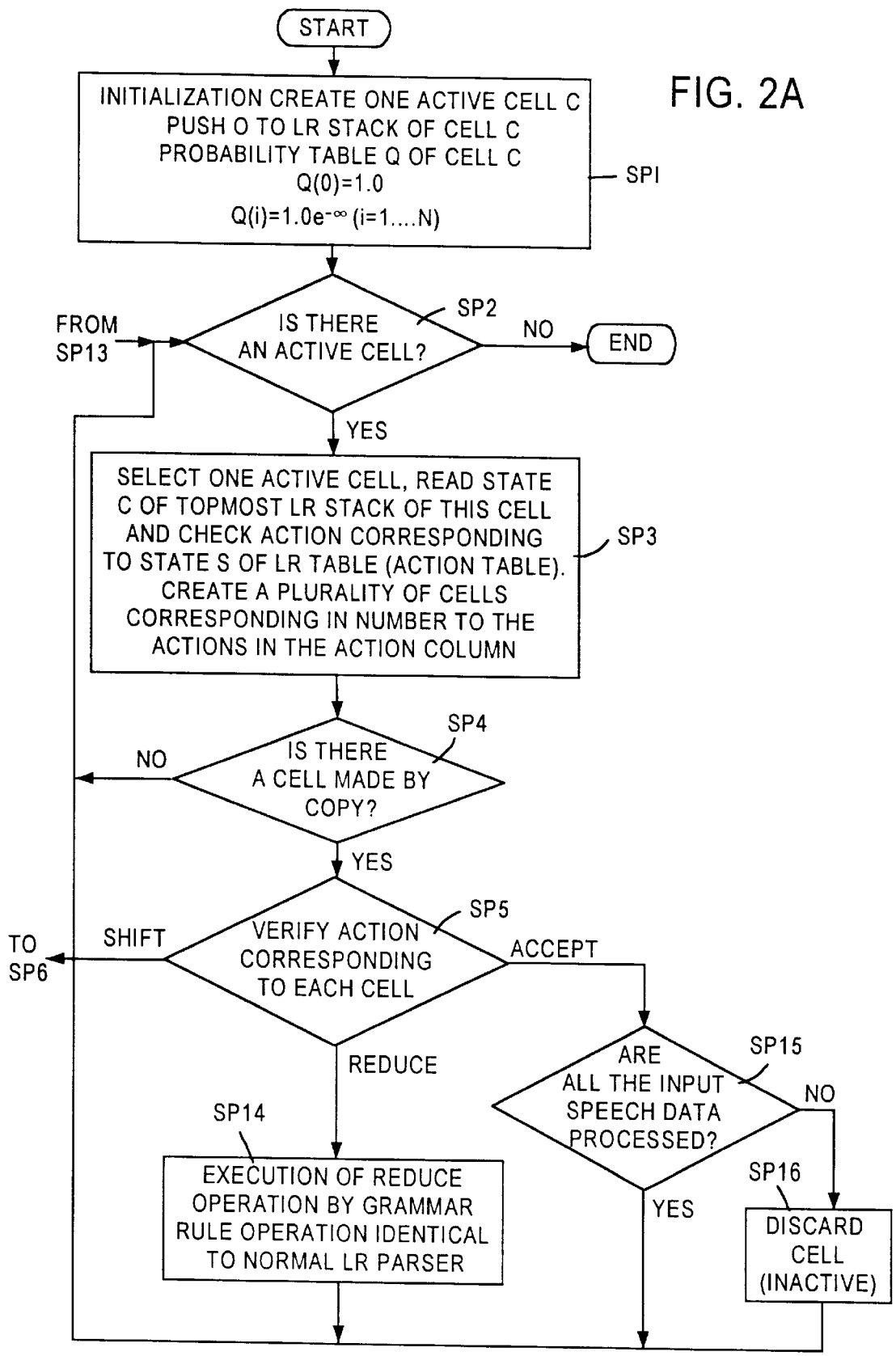
FIGS. 2A and 2B are flow charts for explaining the operation of an embodiment of the present invention.
Figure 2B:
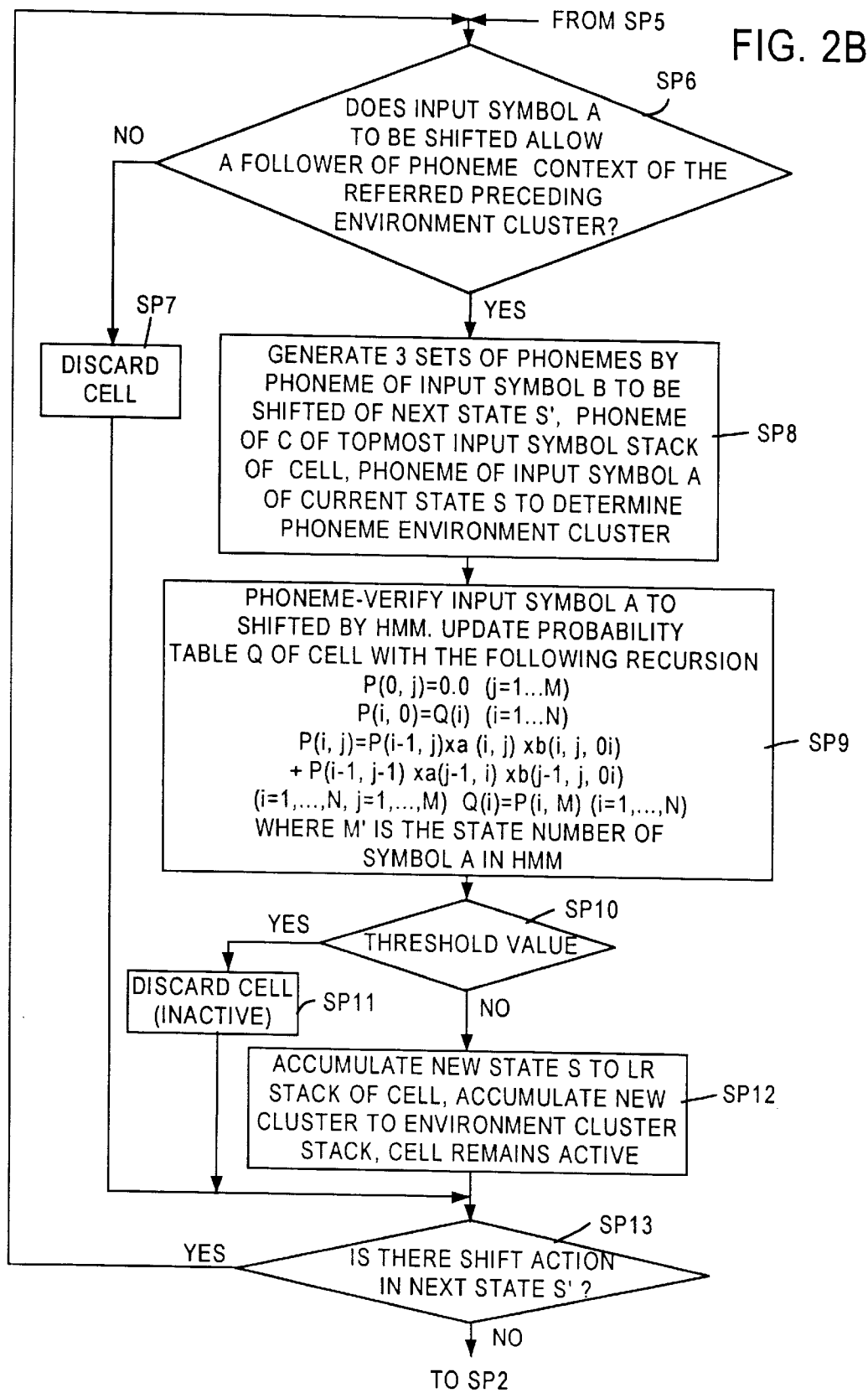
Figure 3:
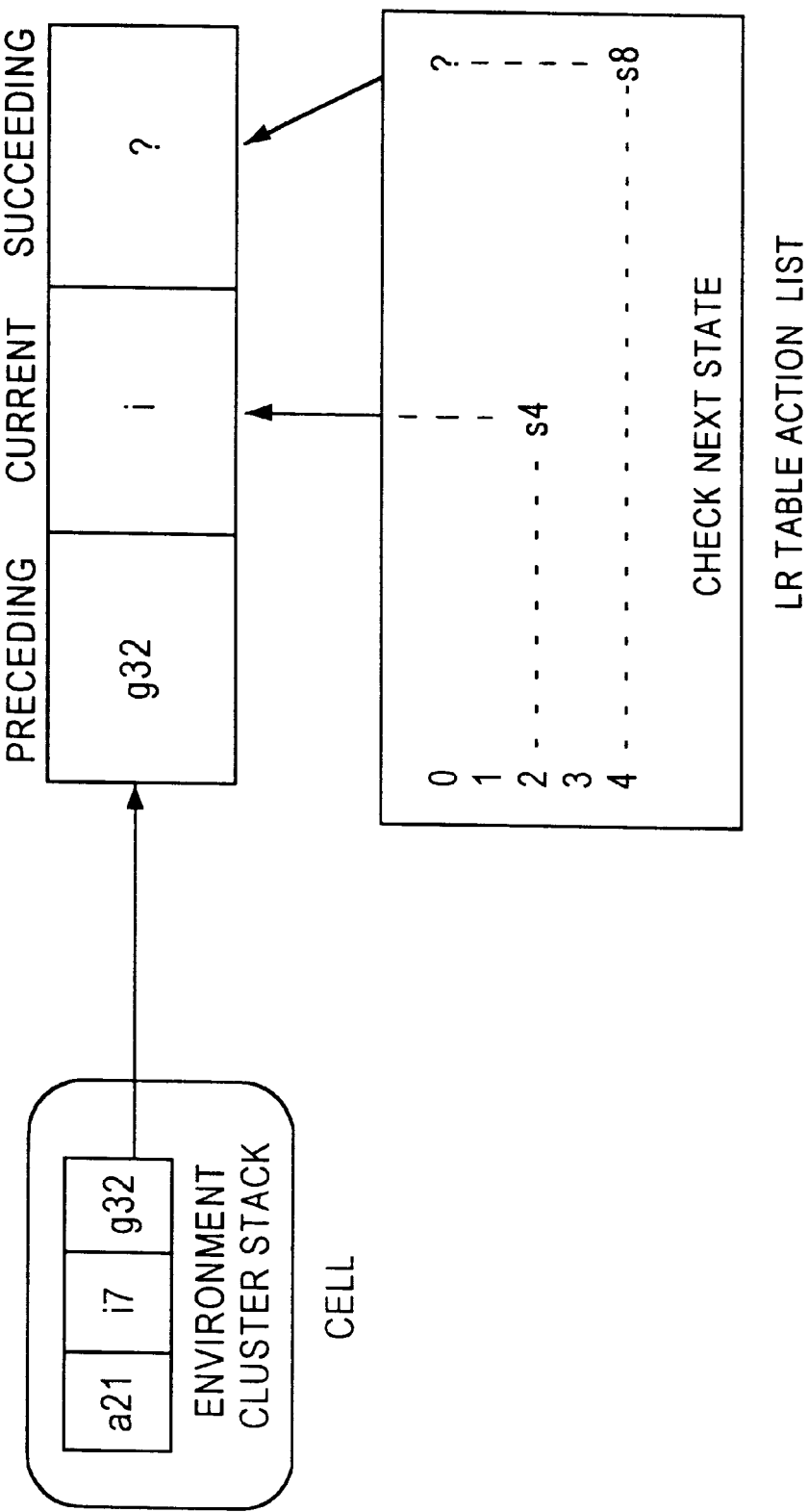
FIG. 3 is a diagram for explaining the prediction action of phoneme context.
Figures 4, 6:
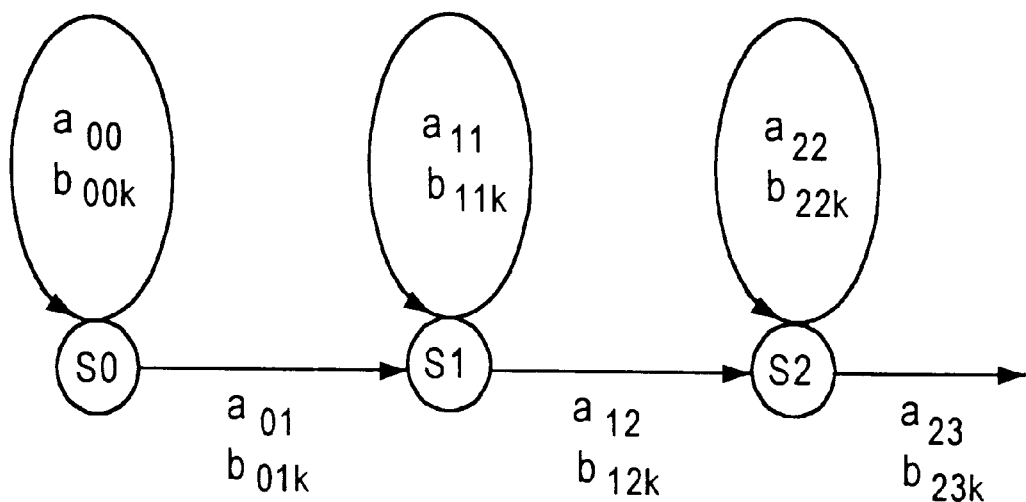
FIG. 4 shows an example of a grammar rule.
FIG. 6 shows an example of a HMM.

FIGS. 2A and 2B are flow charts for explaining the specific operation of the embodiment of the present invention. FIG. 3 is a diagram for explaining the prediction action of the phoneme context.

The specific operation of the embodiment of the present invention will be explained hereinafter with reference to FIGS. 2A, 2B and 3.

The information stored in a cell comprises the following as shown in FIG. 3:

(1) State stack of LR parser
(2) Stack of phoneme environment cluster
(3) Value of probability table Q(1) . . . Q(N) calculated in the preceding phoneme verification. N is the length of the symbol string corresponding to the input phoneme data.

Referring to FIG. 2A, at step (abbreviated as SP in the drawings) SP1 where the analysis commences, only one cell C exists with state 0 pushed on the topmost step of the state stack of the LR parser of the only one cell C. The following values are given as initial values in the probability table Q of this cell C.

$Q(0)=1.0$ $Q(i)=1.0e^{-\infty}$ (i=1 . . . N)

At step SP2, prediction LR parser 108 makes determination whether there is an active cell or not. If NO, the analysis terminates. Otherwise, one active cell is selected at step SP3. State s at the topmost stage of the LR state stack of that cell is read, and the action column corresponding to state s of LR table 106 is read. Prediction LR parser portion 108 then makes a plurality of cells corresponding in number to the actions in the action column. The produced cell copies are used to execute one operation. The following operation is carried out for the copied cell.

At step SP4, determination is made whether there is a cell made by copy operation. If NO, control returns to step SP2, otherwise operation proceeds to step SP5. At step SP5, the action corresponding to each cell is verified. If the selected action is SHIFT, control proceeds to step SP6 in FIG. 2B. The above-described steps SP1 to step SP5 are identical to the process of the normal HMM-LR method.

At step SP6, the topmost stage of the environment cluster stack in the relevant cell is referred to. Determination is made whether input symbol A to be SHIFTed allows a follower of phoneme context for the environment cluster. If a follower is not allowed, the cell is discarded at step SP7. Otherwise, control proceeds to step SP8. At step SP8, a hypothesis of the prediction phoneme context is established as will be discussed below. The prediction phoneme context includes three factors of a preceding phoneme, a current phoneme, and a succeeding phoneme.

First, action of the next state S' to be SHIFTed is referred to from the current state S. Input symbol B in the item of the SHIFT action becomes the predicted succeeding phoneme of the input symbol A. If there is an action other than SHIFT in the subsequent state S' to be SHIFTed, the program step will be skipped. Next, the input symbol C at the topmost step of the stack of the input symbol of the relevant cell is regarded as the preceding phoneme. A predicted phoneme context is generated by the three sets of phonemes of the preceding phoneme C, the above described predicted succeeding phoneme B, and the above described input symbol A. The phoneme environment cluster is determined by this phoneme context.

At step SP9, the input symbol to be SHIFTed is phoneme-verified at HMM phoneme verification portion 101 using a phoneme context dependent type HMM phoneme model corresponding to the above determined phoneme environment cluster. At this time, the updated calculation of the values of the probability table in the cell is identical to the update calculation of the aforementioned normal HMM-LR method. Determination is made at step SP10 whether Q(i) having the highest probability value in the probability table Q(1) . . . Q(N) updated by the above described calculation is smaller than a threshold value.

If Q(i) having the highest probability value is smaller than the threshold value, this cell is discarded at step SP11 and becomes inactive. Otherwise, a new state is provided to the LR state stack at step SP12, and the above determined phoneme environment cluster is accumulated upon the stack of the environment cluster. In this case, the cell remains active. The control then proceeds to step SP13 to determine whether a SHIFT action exists in the next state S' that is referred to in the LR table 106. If a SHIFT exists, control returns to step SP6, otherwise to step SP2.

If the selected action is REDUCE in the aforementioned step SP5, control proceeds to step SP14 to carry out a reduce action by a grammar rule. This is identical to the operation of a normal LR parser. The cell remains active at this time. If determination is made that the selected action is ACCEPT at step SP5 and determination is made that all the input speech data has been processed at step SP15, the analysis terminates in succession. Otherwise, the cell is discarded at step SP16, and control returns to step SP2.

Thus, according to the embodiment of the present invention, a LR parser is realized that can carry out an action according to a phoneme context in continuous speech recognition by the HMM-LR method to allow the use of a phoneme context dependent type phoneme model using the phoneme context dependent type LR parser.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A continuous speech recognition apparatus, comprising:

a memory storing an LR table;

a prediction LR parser using an action specification item from the stored LR table for predicting a phoneme;

phoneme context predicting means for predicting a phoneme context in the vicinity of the phoneme predicted by said prediction LR parser using an action specification item from the stored LR table;

a memory storing context dependent HMM data characterizing a plurality of types of phonemes which may be found in speech; and phoneme verifying means, responsive to an input speech signal, for verifying existence of the predicted phoneme by using context dependent HMM data corresponding to the predicted phoneme context to determine the probability that the predicted phoneme exists in the input speech signal, wherein each time that the phoneme verifying means verifies existence of a phoneme, the verified phoneme is applied to the prediction LR parser such that the prediction LR parser predicts a succeeding phoneme, the phoneme context predicting means predicts a phoneme context in the vicinity of the predicted succeeding phoneme, and the phoneme verifying means uses context dependent HMM data corresponding to the predicted phoneme context in the vicinity of the predicted succeeding phoneme to determine the probability that the predict succeeding phoneme exists in the input speech signal, whereby the continuous speech recognition apparatus develops a symbol string based on a series of verified phonemes representing a sentence or phrase.

2. A continuous speech recognition apparatus as in claim 1, wherein the phoneme context predicted by the phoneme context predicting means defines a phonetic triplet for one phoneme in one context including a phoneme expected to precede the one phoneme and a phoneme expected to succeed the one phoneme in the one context.

3. A continuous speech recognition method, comprising the steps of:

(1) in response to a currently verified phoneme, predicting a subsequent phoneme using an action entry in a stored left to right (LR) parser table;

(2) predicting a phoneme context for the predicted subsequent phoneme;

(3) verifying existence of the predicted subsequent phoneme in the input speech signal using a phoneme context dependent type hidden Markov phoneme model which corresponds to the predicted phoneme context to calculate a probability that the predicted subsequent phoneme exists in the input speech signal;

(4) executing steps (1) through (3) repeatedly, each repetition using the predicted subsequent phoneme as a new currently verified phoneme to thereby produce a symbol string of verified phonemes representative of a sentence or phrase in the input speech signal as a recognition result.

4. A continuous speech recognition method as in claim 3, wherein each phoneme context dependent type hidden Markov phoneme model defines a phonetic triplet for one phoneme in one context including a phoneme expected to precede the one phoneme in the one context, the one phoneme and a phoneme expected to succeed the one phoneme in the one context.

5. A continuous speech recognition apparatus, comprising:

a memory storing a left to right (LR) parsing table which indicates parsing actions based on context free grammar;

a predictive LR parser using the stored LR parsing table for sequentially predicting phonemes to be verified;

phoneme context predicting means for predicting a phoneme context of each phoneme to be verified using action entries from the stored LR parsing table;

a memory storing phoneme context dependent hidden Markov model data characterizing allophonic types of the phoneme to be found in speech verified; and phoneme verifying means, responsive to an input speech signal, for using phoneme context dependent hidden Markov model data corresponding to each predicted phoneme context to determine the acoustic probability that each phoneme to be verified exists in the input speech signal to develop a symbol string based on a sequence of verified phonemes representing a phrase or sentence of recognized speech.

* * * * *